Figure 1:
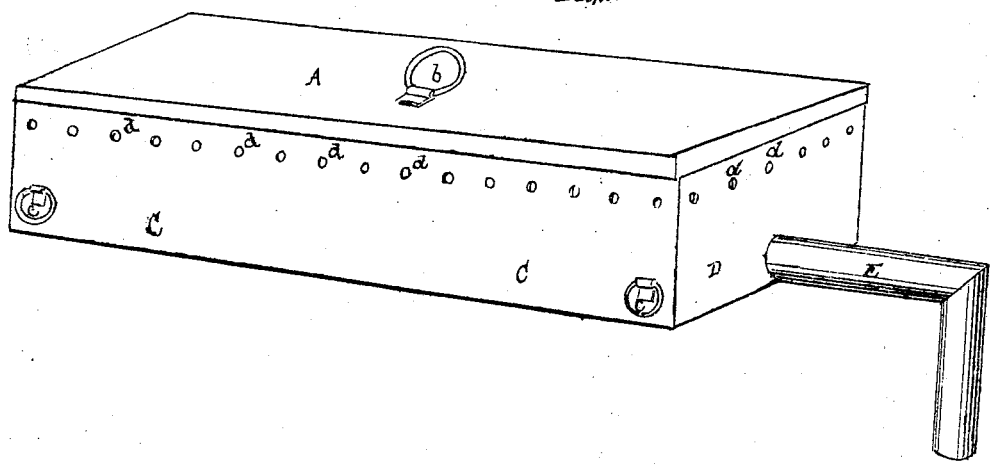
Figure 1:
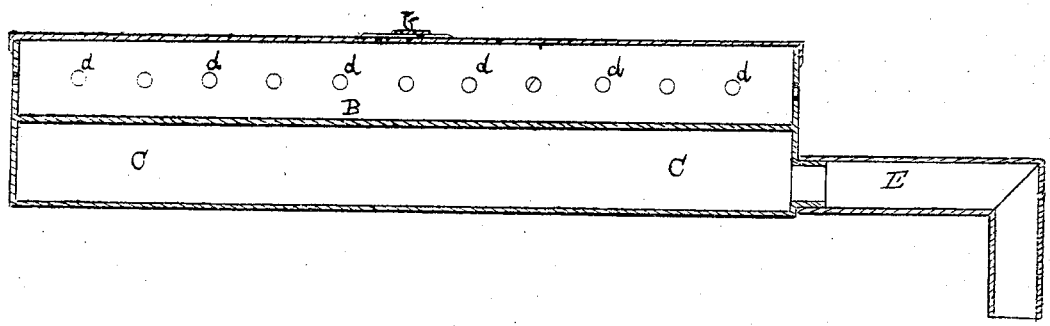

Marcus W. Florer
Imp. Fruit Dryer.

No. 72471

PATENTED
DEC 24 1867

Witness
N. W. Hudson
A. M. Stout

Marcus W. Flora
by his Atty A. N. Evans

UNITED STATES PATENT OFFICE.

MARCUS W. FLORER, OF BRACKEN COUNTY, KENTUCKY.

FRUIT-DRIER.

Specification forming part of Letters Patent No. 72,471, dated December 24, 1867.

*To all whom it may concern:*

Be it known that I, MARCUS W. FLORER, a citizen of Bracken county and State of Kentucky, have invented a new and useful Improvement on Modes for Drying Fruit; and I do hereby declare the following to be a full and clear and exact description thereof, reference being had to the accompanying drawings and the letters of reference marked thereon.

To enable others to understand my invention, I will state its nature consists in a tin or other thin metal case, into which steam is introduced, by the heat of which fruit, grain, or other articles are dried on the case without any danger of being scorched or without having their juices all evaporated.

To enable others skilled in the art to make and use my invention, I will proceed to describe its construction and operation.

I construct my steam-chest of tin, zinc, iron, or any suitable sheet metal, and usually of a size of five by three feet, with a depth of about six to ten inches. The size, however, can be adapted to the taste of the person to use the same.

A represents the top on the upper portion or edging B, wherein the fruit, &c., is placed to be dried.

C represents the lower part or steam-chest; D, the end of the same; E, the pipe, to be connected with the boiler, and through which the steam is conveyed to the chest. *b* is a ring or handle for lifting off the top. *c c* are handles placed on each side of the chest, for the convenience of lifting it from place to place. *d d* are ventilators for the fruit in the process of drying. Instead of placing the cover A on the fruit-holder, a corresponding case may be placed on it and others piled up indefinitely, the cover A being placed over the top case until no longer necessary.

This improved drier can be used either in or out of doors, and needs only an ordinary farmer's kettle to generate the steam sufficient to dry six to ten bushels of fruit per day. The great advantage of the fruit thus dried by steam instead of dry heat is, it preserves its sweetness, the saccharine matter being dried with the fruit instead of being driven off in the evaporation. Another material advantage is that there is no danger of burning or scorching the fruit to be dried, or in heating up fruit already dried in order to kill worms which may have gotten in it. This heating up can be done without danger of burning, which is not the case with driers heated by dry heat. Another great advantage of my new improvement is the small quantity of fuel consumed.

The inventor has had much experience in fruit-drying, and he ventures to say his new invention will not consume more than one-fourth the quantity of any other mode now known or used; and this great saving arises partially from the fact that the steam, as fast as it condenses, returns through the pipe to the boiler already partially heated, and requiring but little fuel to convert again into steam.

The steam-pipe is introduced into the kettle or boiler through a cheap wooden or metal cover, and the chest is placed slightly inclined, in order to insure the return of the condensed steam to the boiler.

What I claim as my invention, and desire to secure by Letters Patent, is—

The box or chest C, fruit-holder B, and pipe E, when used in connection with the ordinary farmer's or cooking kettle for generating steam, substantially as and for the purpose described.

M. W. FLORER.

Witnesses:
JOHN D. BLOOR,
JOHN S. HOLLINGSHEAD.